United States Patent
Hoehmann et al.

(10) Patent No.: US 11,550,940 B2
(45) Date of Patent: Jan. 10, 2023

(54) TENANT SEPARATION FOR ANALYTICAL APPLICATIONS IN A REMOTE APPLICATION INTEGRATION SCENARIO

(71) Applicant: SAP SE, Walldorf (DE)

(72) Inventors: Tobias Hoehmann, Heidelberg (DE); Peter Weddeling, Sinsheim (DE); Bare Said, Sankt Leon Rot (DE)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 16/221,195

(22) Filed: Dec. 14, 2018

(65) Prior Publication Data

US 2020/0193043 A1 Jun. 18, 2020

(51) Int. Cl.
| | |
|---|---|
| G06F 16/907 | (2019.01) |
| G06F 16/95 | (2019.01) |
| G06F 16/25 | (2019.01) |
| G06F 21/62 | (2013.01) |
| G06F 21/60 | (2013.01) |
| H04L 9/32 | (2006.01) |

(52) U.S. Cl.
CPC ........ G06F 21/6218 (2013.01); G06F 16/252 (2019.01); G06F 16/907 (2019.01); G06F 16/95 (2019.01); G06F 21/604 (2013.01); H04L 9/3213 (2013.01); G06F 2221/2141 (2013.01)

(58) Field of Classification Search
CPC .... G06F 21/6218; G06F 16/907; G06F 16/95; G06F 16/252; G06F 21/604; G06F 2221/2141; H04L 9/3213
See application file for complete search history.

(56) References Cited

U.S. PATENT DOCUMENTS

| | | | | |
|---|---|---|---|---|
| 2013/0198363 A1* | 8/2013 | Kolluru | ............... | G06F 11/3476 709/224 |
| 2015/0082432 A1* | 3/2015 | Eaton | .................. | H04L 43/0817 726/23 |
| 2016/0094484 A1* | 3/2016 | Mordani | ................. | H04L 67/10 709/226 |
| 2017/0068954 A1* | 3/2017 | Hockey | ................. | H04L 9/3213 |
| 2017/0142108 A1* | 5/2017 | Zhang | ................. | H04L 63/0823 |
| 2017/0187771 A1* | 6/2017 | Falcon | .................... | G06F 3/165 |

(Continued)

OTHER PUBLICATIONS

Pippal et al., "A simple, adaptable and efficient heterogeneous multi-tenant database architecture for ad hoc cloud", 2013 (Year: 2013).*

(Continued)

*Primary Examiner* — Dawaune A Conyers
(74) *Attorney, Agent, or Firm* — Mintz Levin Cohn Ferris Glovsky and Popeo, P.C.

(57) ABSTRACT

A tenant separation architecture is provided to adopt tenant separation for remote integration of various OEM systems with a cloud-based analytics application. The tenant separation architecture provided herein allows for tenant separation in a wide range of modules in different OEM integration scenarios through a token-base authentication. Application server tenants and database tenants may be accessed for application of the tenant separation. Moreover, the tenant separation implementations disclosed herein may be applied to different modules for metadata, tenant configuration, authorization concepts, and general data protection regulation (GDPR) adoption.

9 Claims, 4 Drawing Sheets

(56) References Cited

U.S. PATENT DOCUMENTS

| | | | |
|---|---|---|---|
| 2018/0077138 A1* | 3/2018 | Bansal | H04L 63/0815 |
| 2020/0007531 A1* | 1/2020 | Koottayi | H04L 67/141 |
| 2020/0021574 A1* | 1/2020 | Pinner | H04L 63/0815 |
| 2020/0092271 A1* | 3/2020 | Kumar | H04L 63/101 |

OTHER PUBLICATIONS

Zaikin et al., "Building Multi-tenant Web API using dot net core and best practices (Tutorial)", Mar. 3, 2018 (Year: 2018).*

* cited by examiner

TENANT SEPARATION FOR ANALYTICAL APPLICATIONS IN A REMOTE APPLICATION INTEGRATION SCENARIO

FIELD

The present disclosure generally relates to integration of a cloud-based analytics application with various application systems and, more specifically, to preserving tenant separation in live data connections of various application systems with a cloud-based analytics system.

BACKGROUND

A multitude of application systems, such as various OEM application systems, may provide analytics capability for a user. An analytics application may rely on data from one or more such application systems or data sources that reside in their own data centers. The application systems may each have a unique data structure, and thus may require unique handling to expose requested data to the user.

SUMMARY

Methods, systems, and articles of manufacture, including computer program products, are provided for a tenant separation architecture configured to adopt tenant separation for remote integration of various OEM systems with a cloud-based analytics application.

According to aspects of the current subject matter, a computer-implemented method includes: receiving, by a processing component of an application datacenter and from an analytics application to which the application datacenter is in communication, an authentication token including a tenant identifier; injecting, by the processing component and into one or more of a plurality of modules of the application datacenter, the authentication token; and configuring, by the processing component, structural parts of the one or more of the plurality of modules consistent with the authentication token such that the one or more of the plurality of modules are executed for data associated with the tenant identifier.

In an inter-related aspect, a system includes at least one data processor, and at least one memory storing instructions which, when executed by the at least one data processor, result in operations including: receiving, from an analytics application, an authentication token including a tenant identifier; injecting, into one or more of a plurality of modules of an application datacenter, the authentication token; and configuring structural parts of the one or more of the plurality of modules consistent with the authentication token such that the one or more of the plurality of modules are executed for data associated with the tenant identifier.

In an inter-related aspect, a non-transitory computer-readable storage medium includes program code, which when executed by at least one data processor, causes operations including: receiving, from an analytics application, an authentication token including a tenant identifier; injecting, into one or more of a plurality of modules of an application datacenter, the authentication token; and configuring structural parts of the one or more of the plurality of modules consistent with the authentication token such that the one or more of the plurality of modules are executed for data associated with the tenant identifier.

In some variations, one or more of the features disclosed herein including the following features can optionally be included in any feasible combination. The authentication token may include a JavaScript object notation web token. The tenant identifier may be configured as part of a live connectivity connection on the analytics application. The authentication token may be sent from the analytics application to the processing component of the application datacenter via a tenant injection module of a user browser. The one or more of the plurality of modules may include a database tenant, and configuring structural parts of the database tenant may include adding the tenant identifier to a semantic model of the database tenant. The one or more of the plurality of modules may include an application server tenant, and configuring structural parts of the application server tenant may include adding the tenant identifier into application server callbacks of the application server tenant. The one or more of the plurality of modules may include an analytics application managed layer, and configuring structural parts of the analytics application managed layer may include utilizing the tenant identifier for a managed set of metadata for the analytics application managed layer. Injecting the authentication token may be based on one or more of authentication, permissions, tenant configuration, metadata transformation, and/or general data protection regulation.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
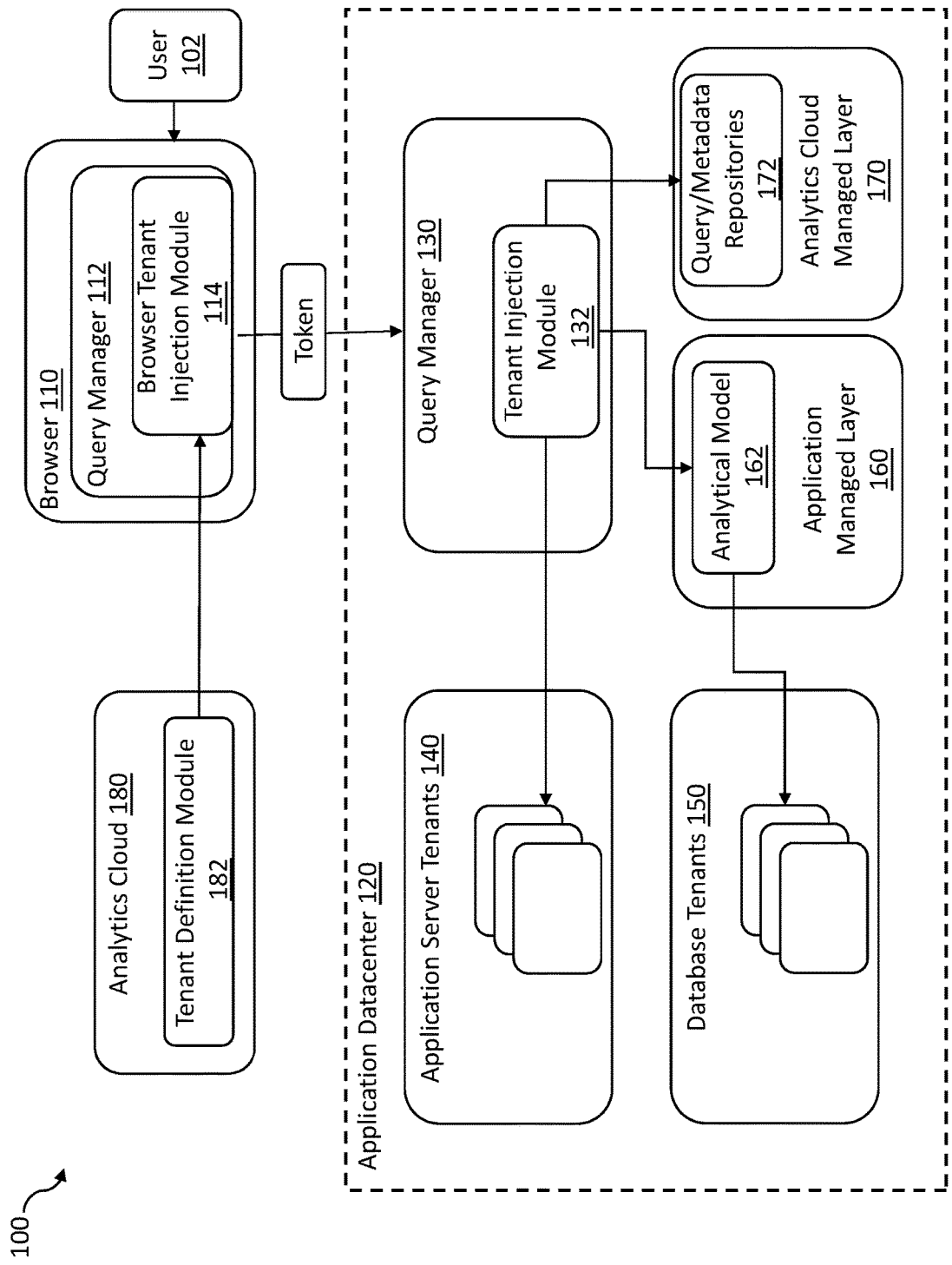
FIG. 1 is a block diagram illustrating a tenant separation architecture consistent with implementations of the current subject matter.

Like labels are used to refer to same or similar items in the drawings.

DETAILED DESCRIPTION

A cloud-based analytics application may rely on data from one or more applications or data sources that reside in their own data centers. Remote access of data, for example transactional data, from the applications may be used directly for analytical purposes.

Application systems, such as OEM systems, may serve many different customers. The data model of the OEM system thus needs to be consumed by various outside customers. The customer spaces may be separated into technical tenants by a variety of separation concepts depending on the need of the specific OEM system. Thus it is a crucial requirement in live data connections, during which data is directly retrieved, to preserve tenant separation. It is also of importance in an integrated analytics application to provide a unified, cloud-based approach to tenant separation.

Consistent with implementations of the current subject matter, a tenant separation architecture is provided to adopt tenant separation for remote integration of various OEM systems with a cloud-based analytics application. The tenant separation architecture provided herein allows for tenant separation in a wide range of modules in different OEM integration scenarios. According to aspects of the current subject matter, application server tenants and database tenants may be accessed for application of the tenant separation. Moreover, the tenant separation implementations disclosed herein may be applied to different modules for metadata, tenant configuration, authorization concepts, and general data protection regulation (GDPR) adoption.

FIG. 1 depicts a block diagram illustrating a tenant separation architecture 100 consistent with implementations of the current subject matter. The architecture 100 implements a method to separate tenants in an application datacenter 120, as described in detail herein.

The tenant separation for analytical applications, consistent with implementations of the current subject matter, is a token-based authentication. In particular, an authentication token that includes a tenant identifier is provided via a browser tenant injection module 114 of a browser 110 to a tenant injection module 132 of an application datacenter 120. According to some aspects of the current subject matter, the authentication token may be a JavaScript object notation (JSON) web token (JWT token). The browser tenant injection module 114 may be part of a query manager 112 of the browser 110 that is used by a user 102 to formulate and submit queries. The tenant identifier is configured as part of a live connectivity connection on a cloud-based analytics application 180, and in particular from a tenant definition module 182 of the cloud-based analytics application 180. It is passed via authentication token to a query manager service component 130 of the application datacenter 120. From here, consistent with implementations of the current subject matter, the tenant identifier is injected into various modules of the application datacenter 120 for application context. The various modules of the application datacenter 120 may include application server tenants 140, database tenants 150, an application managed layer 160 which may include transactional data storage, and an analytics cloud managed layer 170 which generates analytical artifacts (e.g., for a number of different data sources).

Analytical artifacts are generated by the query manager 132, which runs in the application datacenter 120. The query manager 132 itself injects the tenant identifier into the specific contexts of the application datacenter 120 from where it can be consumed by the structural part of the analytical model as defined by the application datacenter 120. With this approach, it is possible to completely separate different tenants from one another so that the analytical applications are only executed for the data associated with the tenant which is configured in the live data connection of the tenant definition module 182 of the cloud-based analytics application 180.

Moreover, implementations of the current subject matter provide a flexible tenant separation on module level, so that the tenant separation method may be flexibly configured for different modules in order to the specific requirements of the particular application.

Aspects of the current subject matter provide for injection of the tenant identifier into the application managed layer 160 which, as noted above, may include transactional data storage. This concept may be particularly relevant for separation of tenants on a database level. As shown in FIG. 1, the authentication token which includes the tenant identifier is provided from the tenant injection module 132 to a structural part of the analytical model 162 of the application managed layer 160 and to the various database tenants 150. Thus the injected tenant is leveraged by adding it to the structural part of the semantic model (for example, as part of a where clause in a structured query language (SQL) view). This concept may be preferable for applications that specify tenants on a non-schema based separation concept. In some implementations, one database column in each underlying database table reflects the tenant identifier, and the injected tenant may be used to return only the data relevant for the selected tenant.

Aspects of the current subject matter also provide for injection of the tenant identifier into the application server tenants 140. As shown in FIG. 1, the authentication token which includes the tenant identifier is provided from the tenant injection module 132 to the various application server tenants 140. That provides for the cloud-based analytics application 180 to inject the tenant into the application server callbacks, which may, in some implementations, be useful for modules that require complex application logic for different tenants.

Aspects of the current subject matter further provide for injection of the tenant identifier into query and metadata repositories 172 of the analytics cloud managed layer 170. As shown in FIG. 1, the authentication token which includes the tenant identifier is provided from the tenant injection module 132 to the various query and metadata repositories 172. This provides for injection of the tenant into integration context of the analytics application 180 and for separation by tenant layering in the analytics cloud managed layer 170. The injection of the tenant, in some implementations, may be homogeneously used for the analytics application set of metadata.

The module adoption of tenant separation provided by implementations of the current subject matter allows for tenant separation for different applications to be configured by an adaptor integrated into the query manager 130, providing for flexibility to define an appropriate separation technique for a specific module for an application. This is illustrated in block diagram 200 of FIG. 2. Flexibility of the module-specific application of tenant separation, in accordance with implementations of the current subject matter, is provided per application.

An application server 210, such as an OEM application server, is coupled to a platform adaptor 220 that includes various adapter modules for configuring the application modules of the application datacenter 120 (the application server tenants 140, the database tenants 150, the application managed layer 160, and the analytics cloud managed layer 170). The modules of the platform adaptor 220 may include, for example, an authentication adaptor 221, a permission adaptor 222, a tenant configuration adaptor 223, a metadata transformation adaptor 224, and a GDPR adaptor 225.

Authentication and tenant configuration (via the authentication adaptor 221 and the tenant configuration adaptor 223) may be based on tenant separation for the application server tenants 140 since the execution of these modules is, for example, for many applications needed in order to define database connectivity. Tenant separation for the database tenants 150 may not be applicable with respect to authentication and tenant configuration. The permission adapter 222 may be based on tenant separation for the application server tenants 140 or tenant separation for the database tenants 150. The application server tenants 140 and the database tenants 150 may depend largely on the complexity of fine-granular user permissions provided by the application datacenter 120. Increased complexity of these authorizations may, in some implementations, require the application of the tenant separation for the database tenants 150. However, in simpler cases the application of tenant separation for the application server tenants may be preferred because of the lower footprint of this method. Analogous arguments as for the permission adaptor 222 are also applicable, in some implementations, to the metadata transformation adaptor 224 and the GDPR adaptor 225. Configuration of the adapter 220 is realized by a parameter which depicts which specific application or OEM implementation is to be processed. The parameter is to be set during deployment of the query manager 130 into the application datacenter 120.

Figure 3:
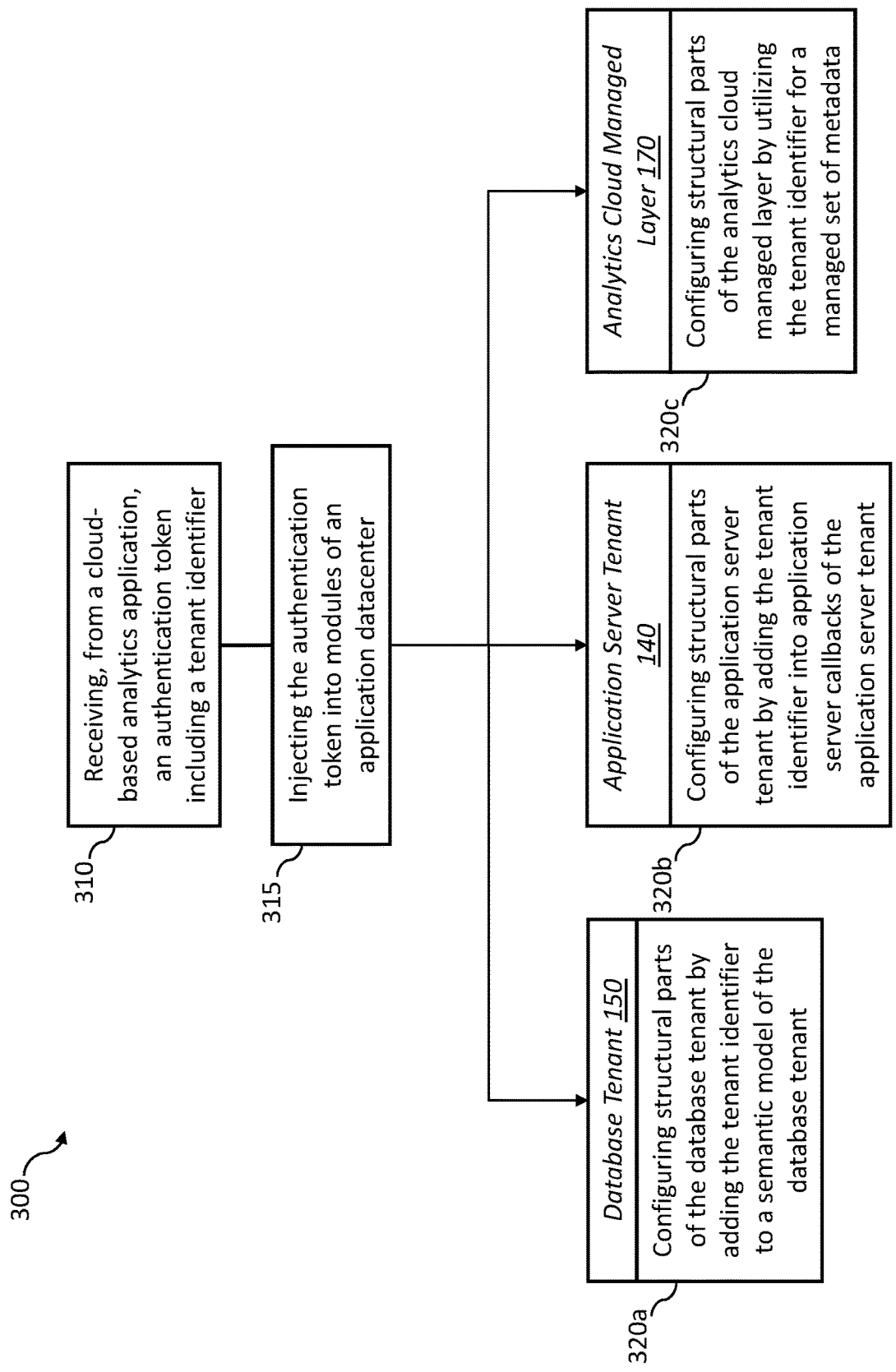
FIG. 3 depicts a flowchart illustrating a process for implementing a tenant separation architecture consistent with implementations of the current subject matter.

FIG. 3 depicts a flowchart 300 illustrating a process for tenant separation in live data connections of various application systems with the cloud-based analytics application 180 consistent with implementations of the current subject matter.

At 310, the tenant injection module 132 of the query manager 130 of the application datacenter 120 receives an authentication token which includes a tenant identifier. In some implementations, the authentication token includes a JWT token. In some implementations, the tenant identifier is configured as part of a live connectivity connection on the analytics application 180. The authentication token is sent from the cloud-based analytics application to the tenant injection module 132 via the browser tenant injection module 114 of the browser 110.

At 315, the tenant injection module 132 injects the authentication token into one or more of the plurality of modules of the application datacenter 120. As described herein, the modules may include the application server tenants 140, the database tenants 150, the application managed layer 160 which may include transactional data storage, and the analytics cloud managed layer 170 which generates analytical artifacts (e.g., for a number of different data sources).

At 320, the structural parts of the one or more of the plurality of modules of the application datacenter 120 are configured consistent with the authentication token such that the modules are executed for data associated with the tenant identifier.

As shown in FIG. 3, the configuration may include, for the database tenant 150, configuring structural parts of the database tenant 150 by adding the tenant identifier to a semantic model of the database tenant 150 (320a).

As also shown in FIG. 3, the configuration may include, for the application server tenant 140, configuring structural parts of the application server tenant 140 by adding the tenant identifier into application server callbacks of the application server tenant 140 (320b).

For the analytics cloud managed layer 170, the configuration may include configuring structural parts of the analytics cloud managed layer 170 by utilizing the tenant identifier for a managed set of metadata for the analytics cloud managed layer 170 (320c).

Figure 2:
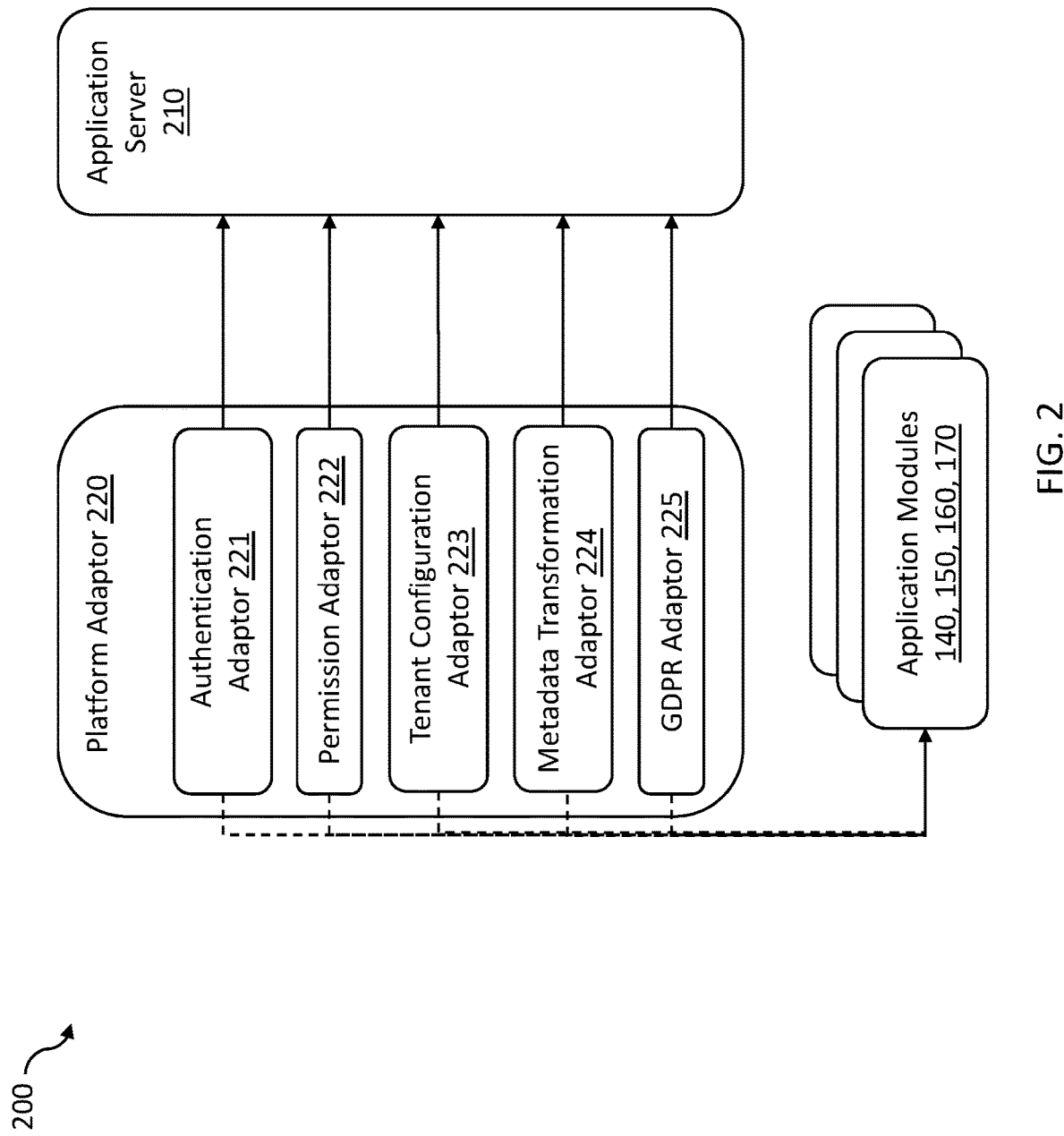
FIG. 2 is a block diagram illustrating features of an adapter for tenant separation consistent with implementations of the current subject matter.

Consistent with some implementations of the current subject matter, injecting the authentication token may be based on one or more of authentication, permissions, tenant configuration, metadata transformation, and/or general data protection regulation, as described with respect to FIG. 2.

Implementations of the current subject matter address the issue of tenant separation of customer data being handled differently for different applications, such as OEM applications. These different tenant separation concepts are fine-granular so that different concepts are to be applied for different modules like metadata generation, authorization, and tenant configuration. According to aspects of the current subject matter, tenant separation may be done in a remote integration scenario of a cloud-based analytics application with multiple OEM applications. The tenant separation techniques described herein may be adopted flexibly for each OEM application and also flexibly for the associated modules.

Figure 4:
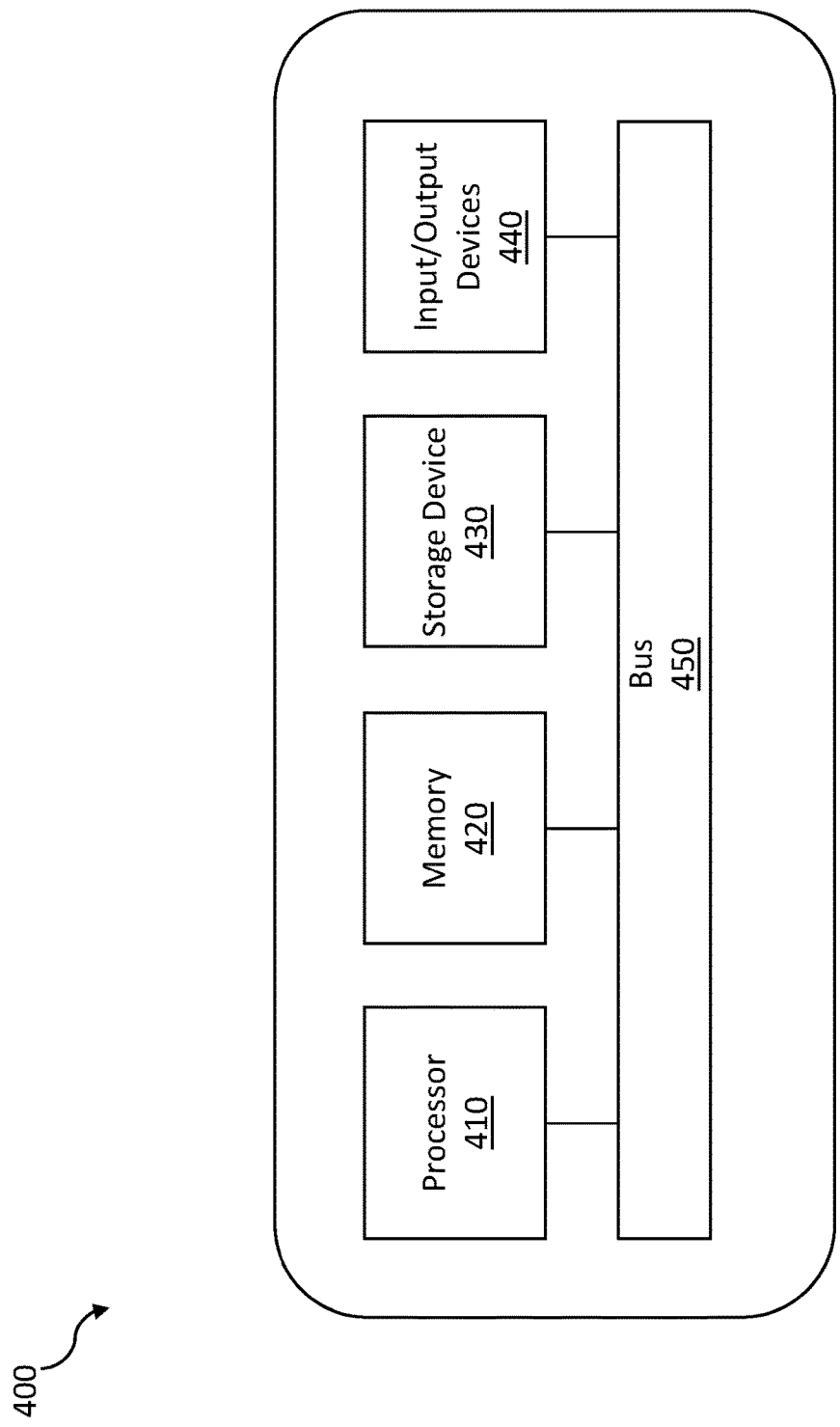
FIG. 4 depicts a block diagram illustrating a computing system consistent with implementations of the current subject matter.

FIG. 4 depicts a block diagram illustrating a computing system 400 consistent with implementations of the current subject matter. Referring to FIGS. 1 and 4, the computing system 400 can be used to implement the tenant separation architecture 100 and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The processor 410 is capable of processing instructions for execution within the computing system 400. Such executed instructions can implement one or more components of, for example, the tenant separation architecture 100. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
receiving, by a processing component of an application datacenter including a plurality of modules, an authentication token from an analytics application, wherein the authentication token is received via a browser tenant injection module of a first query manager of a user browser, wherein the analytics application is in communication with the application datacenter, wherein the authentication token is received at a tenant injection module at a second query manager comprised in the processing component, wherein the authentication token includes a tenant identifier, the tenant identifier defined by a tenant definition module at the analytics application;

injecting, by the processing component including the tenant injection module at the second query manager, the authentication token; and configuring structural parts of the plurality of modules consistent with the authentication token such that the plurality of modules are executed for data associated with the tenant identifier, the configuring of the structural parts of the plurality of modules based on a type of a respective module of each of the plurality of modules and further based on a parameter that defines a respective application of each of the plurality of modules, wherein the configuring further comprises:

in response to at least a first module of the plurality of modules comprising a database tenant of the application datacenter, the injecting of the tenant identifier into the database tenant further causing the configuring to add the tenant identifier to a semantic model of the database tenant of the application datacenter, such that the addition of the tenant identifier to the semantic model provides the tenant identifier to a where clause in a structured query language view;

in response to at least a second module of the plurality of modules comprising an application server tenant of the application datacenter, the injecting of the tenant identifier into the application server tenant further causing the configuring to add the tenant identifier into application server callbacks of the application server tenant to the application datacenter;

in response to at least a third module of the plurality of modules comprising an analytics application managed layer of the application datacenter, the injecting of the tenant identifier into the analytics application managed layer further causing the configuring to use the tenant identifier to query a managed set of metadata for the analytics application managed layer of the application datacenter.

2. The computer-implemented method of claim 1, wherein the authentication token comprises a JavaScript object notation web token.

3. The computer-implemented method of claim 1, wherein the tenant identifier is configured as part of a live connectivity connection on the analytics application, the configuration of the tenant identifier providing separation of the plurality of modules, the separation based on respective requirements of each of the plurality of modules.

4. The computer-implemented method of claim 1, wherein injecting the authentication token is based on one or more of authentication, permissions, tenant configuration, metadata transformation, or general data protection regulation.

5. A system, comprising:
at least one data processor; and
at least one memory storing instructions which, when executed by the at least one data processor, result in operations comprising:
receiving, by a processing component of an application datacenter including a plurality of modules, an authentication token from an analytics application, wherein the authentication token is received via a browser tenant injection module of a first query manager of a user browser, wherein the analytics application is in communication with the application datacenter, wherein the authentication token is received at a tenant injection module at a second query manager comprised in the processing component, wherein the authentication token includes a tenant identifier, the tenant identifier defined by a tenant definition module at the analytics application;

injecting, by the processing component including the tenant injection module at the second query manager, the authentication token; and configuring structural parts of the plurality of modules consistent with the authentication token such that the plurality of modules are executed for data associated with the tenant identifier, the configuring of the structural parts of the plurality of modules based on a type of a respective module of each of the plurality of modules and further based on a parameter that defines a respective application of each of the plurality of modules, wherein the configuring further comprises:

in response to at least a first module of the plurality of modules comprising a database tenant of the application datacenter, the injecting of the tenant identifier into the database tenant further causing the configuring to add the tenant identifier to a semantic model of the database tenant of the application datacenter, such that the addition of the tenant identifier to the semantic model provides the tenant identifier to a where clause in a structured query language view;

in response to at least a second module of the plurality of modules comprising an application server tenant of the application datacenter, the injecting of the tenant identifier into the application server tenant further causing the configuring to add the tenant identifier into application server callbacks of the application server tenant to the application datacenter;

in response to at least a third module of the plurality of modules comprising an analytics application managed layer of the application datacenter, the injecting of the tenant identifier into the analytics application managed layer further causing the configuring to use the tenant identifier to query a managed set of metadata for the analytics application managed layer of the application datacenter.

6. The system of claim 5, wherein the authentication token comprises a JavaScript object notation web token.

7. The system of claim 5, wherein the tenant identifier is configured as part of a live connectivity connection on the analytics application, the configuration of the tenant identifier providing separation of the plurality of modules, the separation based on respective requirements of each of the plurality of modules.

8. The system of claim 5, wherein injecting the authentication token is based on one or more of authentication, permissions, tenant configuration, metadata transformation, and/or general data protection regulation.

9. A non-transitory computer-readable storage medium including program code, which when executed by at least one data processor, causes operations comprising:
receiving, by a processing component of an application datacenter including a plurality of modules, an authentication token from an analytics application, wherein the authentication token is received via a browser tenant injection module of a first query manager of a user browser, wherein the analytics application is in communication with the application datacenter, wherein the authentication token is received at a tenant injection module at a second query manager comprised in the processing component, wherein the authentication token includes a tenant identifier, the tenant identifier defined by a tenant definition module at the analytics application;

injecting, by the processing component including the tenant injection module at the second query manager, the authentication token; and configuring structural parts of the plurality of modules consistent with the authentication token such that the plurality of modules are executed for data associated with the tenant identifier, the configuring of the structural parts of the plurality of modules based on a type of a respective module of each of the plurality of modules and further based on a parameter that defines a respective application of each of the plurality of modules, wherein the configuring further comprises:

in response to at least a first module of the plurality of modules comprising a database tenant of the application datacenter, the injecting of the tenant identifier into the database tenant further causing the configuring to add the tenant identifier to a semantic model of the database tenant of the application datacenter, such that the addition of the tenant identifier to the semantic model provides the tenant identifier to a where clause in a structured query language view;

in response to at least a second module of the plurality of modules comprising an application server tenant of the application datacenter, the injecting of the tenant identifier into the application server tenant further causing the configuring to add the tenant identifier into application server callbacks of the application server tenant to the application datacenter;

in response to at least a third module of the plurality of modules comprising an analytics application managed layer of the application datacenter, the injecting of the tenant identifier into the analytics application managed layer further causing the configuring to use the tenant identifier to query a managed set of metadata for the analytics application managed layer of the application datacenter.

* * * * *